(12) United States Patent
Bassett (10) Patent No.: US 7,556,078 B1
(45) Date of Patent: Jul. 7, 2009

(54) MULTIPLY SLOPED, RIM TRAVERSING, BICYCLE TIRE INSTALLATION TOOL

(76) Inventor: David Robert Bassett, 166 Summit Rd., Springfield, NJ (US) 07081

( * ) Notice: Subject to any disclaimer, the term of this patent is extended or adjusted under 35 U.S.C. 154(b) by 0 days.

(21) Appl. No.: 11/805,382

(22) Filed: May 23, 2007

Related U.S. Application Data (60) Provisional application No. 60/802,329, filed on May 23, 2006.

(51) Int. Cl.
*B60C 25/04* (2006.01)
(52) U.S. Cl. ........................................ 157/1.22; 157/1.3
(58) Field of Classification Search .................. 157/1.3, 157/1.2, 1.22, 1.1, 1.17; D8/31, 88
See application file for complete search history.

(56) References Cited
U.S. PATENT DOCUMENTS

| | | | | |
|---|---|---|---|---|
| 1,320,829 A | * | 11/1919 | Bohne | ........................ 157/1.22 |
| 3,100,011 A | * | 8/1963 | Lydle | ........................ 157/1.22 |
| 3,517,723 A | * | 6/1970 | Hogg et al. | ................. 157/1.24 |
| 3,717,193 A | * | 2/1973 | Craft | ........................... 157/1.3 |
| 3,771,581 A | | 11/1973 | Johnson | |
| 3,823,756 A | * | 7/1974 | Rainey | ........................ 157/1.3 |
| 4,133,363 A | * | 1/1979 | Gardner | ...................... 157/1.3 |
| D395,809 S | | 7/1998 | Brown et al. | |

* cited by examiner

*Primary Examiner*—D. S Meislin (57) ABSTRACT

A tool for completing the mounting of a bicycle tire onto its rim that is superior to those provided by the tools of the prior tire irons. The use of a tool is usually required to complete the job of mounting a bicycle tire to its rim due to the high tension developed in the bead of the tire at that stage. The present invention does not rely on a levering arrangement at all, but instead employs a traveling inclined plane to progressively lift the tire bead to a height above the rim's edge, and a downwardly sloped incline to allow the so lifted bead to then slide down into the rim's interior. The invention utilizes the flange, or rim sidewall, of the wheel rim for both support and guidance as it is impelled forward on the rim by impacts on its trailing surface from an object suitable for the function, such as a hammer. A slot is incorporated into the invention to receive the wheel's flange.

4 Claims, 13 Drawing Sheets

MULTIPLY SLOPED, RIM TRAVERSING, BICYCLE TIRE INSTALLATION TOOL

CROSS REFERENCE TO RELATED APPLICATIONS

This application claims benefit of the PPA titled "Dual sloped, rim traversing bicycle tire installer" that was generated by David Robert Bassett, filed on May 23, 2006, and was assigned the application No. 60/802,329.

FEDERALLY SPONSORED RESEARCH

Not applicable.

SEQUENCE LISTING OR PROGRAM

Not Applicable.

BACKGROUND OF THE INVENTION

1. Field of Invention

This invention relates to tools for work on bicycles.

2. Prior Art

A typical mounting of a bicycle tire to its host wheel begins with pulling one side of a bicycle tire and its associated edge, or bead, over the rim sidewall, or flange, of the hosting bicycle wheel's rim all the way around the periphery of that rim. This places that side of the tire totally within the two inside faces of the rim's flanges. Cross sectional view of the rim (between two spokes) with this completed is FIG. 1. Locating the inner tube's air filler valve stem near the access hole provided for it in the wheel, the inner tube is then tucked into the space within the confines of the interior of the tire and between both inside faces of the wheel rim's flanges. Cross sectional view of the tire and wheel rim with this completed is FIG. 2. The second bead of the tire is then progressively pulled into the confines of the wheel rim's flanges in a way similar to that for the first tire bead. However, the tension on this second tire bead increases progressively as more of the bead is placed in the rim's interior to a point such that the grip of one's hands may be insufficient to pull the rest of the bead into the interior. A view of the progress to this point is FIG. 3.

Presently, the common method of placing the rest of the bead into the interior of the rim to complete the mounting of the tire is to employ several small levers, known as "tire irons", or "tire levers", to force the rest of the bead in. Tire irons are miniature pry bars that have one end flattened and smoothed for easy insertion between the tire and it's hosting rim, and the other end fashioned for use as a handle. U.S. patent No. D395,809 by William P. Brown, entitled "Tire Iron" shows the prior art of a highly ornate, but highly illustrative tire iron design. Though both ends were fashioned as ends to contact the tire and rim, and neither as a handle per se, the flattening of the ends illustrate the insertion and prying functions well.

The use of tire irons is conceptually straightforward. First one inserts a tire iron between the section of the rim's flange you want the tire bead to drop in behind and the bead of the corresponding segment of tire. Then using the rim's flange as a fulcrum, one pivots the iron in the rotational direction to bring the iron's handle end away from the center hub of the wheel, and away from the plane the wheel rim lies in, forcing the bead to follow a circular path up and into the area between the inside faces of the rim's flanges. As soon as the inclination of the iron is sufficiently steep, the tension on the tire bead draws that section of the tire off the iron and into the confines of the rim. One then continues on to the next section of tire still outside the rim. One would continue in this fashion until all the tire is on the rim.

Figure 3:
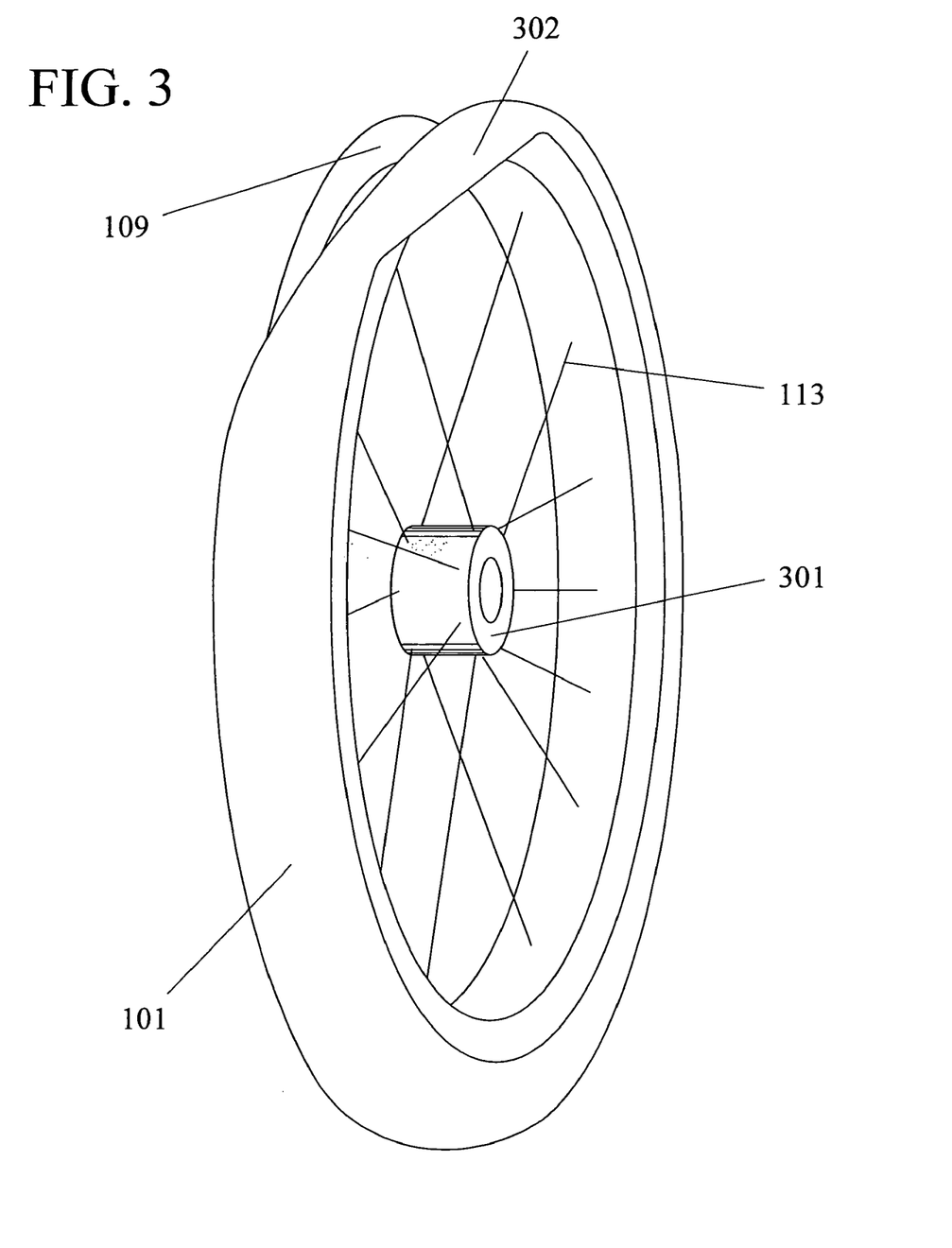
FIG. 3. Bicycle tire mostly mounted to rim, with final section having developed tension.

However, on most actual tire and rim combinations, due to the high and increasing tension in the tire bead from the point of progress depicted in FIG. 3 on, there is a required sequence to how one places the irons as you advance that portion of the tire yet outside the rim into the rim. That sequence begins by inserting a tire iron between the rim and the yet unseated portion of the tire, such that the tire iron is not situated in the middle of the yet unseated portion of the tire, but instead close to either end where the bead transitions from being off the rim to being on the rim. Using the iron at either end insures the bead begins it's travel close to the rim and therefore close to the tip of the iron. This utilizes the mechanical advantage a tire iron is meant to provide. If instead one starts at the middle where the tire bead is stretched between the transition points of the bead as mentioned above, the bead begins it's travel much further away from the fulcrum that is the wheel rim flange's edge (and so closer to the handle end of the iron) than in the previous case, thus negating the mechanical advantage the use of a tire iron (a lever) was to provide in the first place.

Even if the just outlined sequence is adhered to, the tire iron approach has significant problems.

As was mentioned, placing the second tire bead into the bicycle rim can at first be done by hand. As one progresses, it gets more difficult and at some point requires the use of a tool to place the bead within the confines of rim's flanges. One can advance additional lengths of the remaining unmounted bead onto the rim with the use of a single tire iron applied progressively to the remaining sections of bead. However, there comes a point for many tire and rim combinations where the tension in the bead becomes so great that a section of bead successfully levered inside the rim's flanges will pull right back out when the lever is removed. To get such a section of bead to remain placed in the rim, common practice is to commit the lever that put it there as a restraining device. This is done by not removing the lever once it has placed this section of bead, but instead holding it fixed there in its finished position. To progress in the mounting of the tire from this point, one needs to employ additional levers. However, once two irons are employed in this function you need either an assistant or some kind of lever holding fixture to free up another hand so one can continue since to keep an iron in a bead restraining position it must be held. Frequently, three or more irons are needed to get the last bead section to snap into place on the rim. This makes the field use of irons to complete a tire installation with these types of tire and rim combinations impractical.

Another problem one encounters in levering the tire into the rim is that irons tend to slip from their desired position on the rim's edge. Common tire irons are made smooth on their exterior to facilitate easy insertion between the tire and rim, and reduce abrasion to the tire. However, the resulting slipperiness also makes it difficult to keep the iron positioned on the rim where you want it to stay. This tendency increases as the tension in the bead increases as it does toward the end of the tire installation. If the iron slips out from between the tire and the rim, the levering action is not completed, and the tire snaps back to where it was. Also, if one pushes the iron too far into the area between the rims, inner tube penetration (puncture & ruination) can easily result. This particular problem of going too far in is greatly aggravated by the fact that the force exerted radially on the iron (using the point of pivot as a radial origin) by the tire bead changes direction from outward to inward as one passes through the point where the iron is horizontally positioned, that is, parallel to the axle of the hub of the wheel. Keeping the iron from sliding on the rim's edge during that quick transition can be very difficult.

An approach to the mounting of tires to their rims that does not use conventional tire irons is put forth in U.S. Pat. No. 3,771,581 by George A. Johnson, entitled "TIRE IRON" issued on Nov. 13, 1973. The device described therein is basically a rod with a handle end and a grooved end, the rod meant to be kept essentially perpendicular to the outside surface of the rim as it is driven along by impacts to its side such as could be delivered by a hammer, and guided by both the wheel rim placed in the groove of the tool and by the hand not doing the hammering. This device, however, has the drawback that its use requires maintaining a necessary angle between the axis of its handle and the rim's flange, which would be difficult as the device is being hammered. Another drawback this device suffers from is its undesirable but unavoidable effect of delivering a twisting force to the wheel rim that could be sufficient to bend it. The source of the twist is the impact delivered to it at one end whilst the other is held relatively stationary by the user's hand.

SUMMARY OF THE INVENTION

It is the object of the present invention to provide a tool for completing the mounting of a bicycle tire onto its rim that is superior to those provided by the tools of the prior art, notably tire irons. Tire irons are also known as tire levers, since they are actually small pry bars. The use of a tool is usually required to complete the job of mounting a bicycle tire to its rim due to the high tension developed in the bead of the tire at that stage. The present invention does not rely on a levering arrangement at all, but instead employs a traveling inclined plane to progressively lift the tire bead to a height above the rim's edge, and a downwardly sloped incline to allow the so lifted bead to then slide down into the rim's interior. The invention utilizes the flange, or rim sidewall, of the wheel rim for both support and guidance as it is impelled forward on the rim by impacts on its trailing surface from an object suitable for the function, such as a hammer. A slot is incorporated into the invention to receive the wheel's flange.

Three enhancements applicable to either of the two invention embodiments described in this application are presented. The enhancements concern the ease of use, stability, and the safety of the invention embodiments described.

DRAWING DESCRIPTIONS

In the drawings, closely related figures have the same number but different alphabetic suffixes.

DRAWING NUMERICAL REFERENCE LIST

Figure 1:
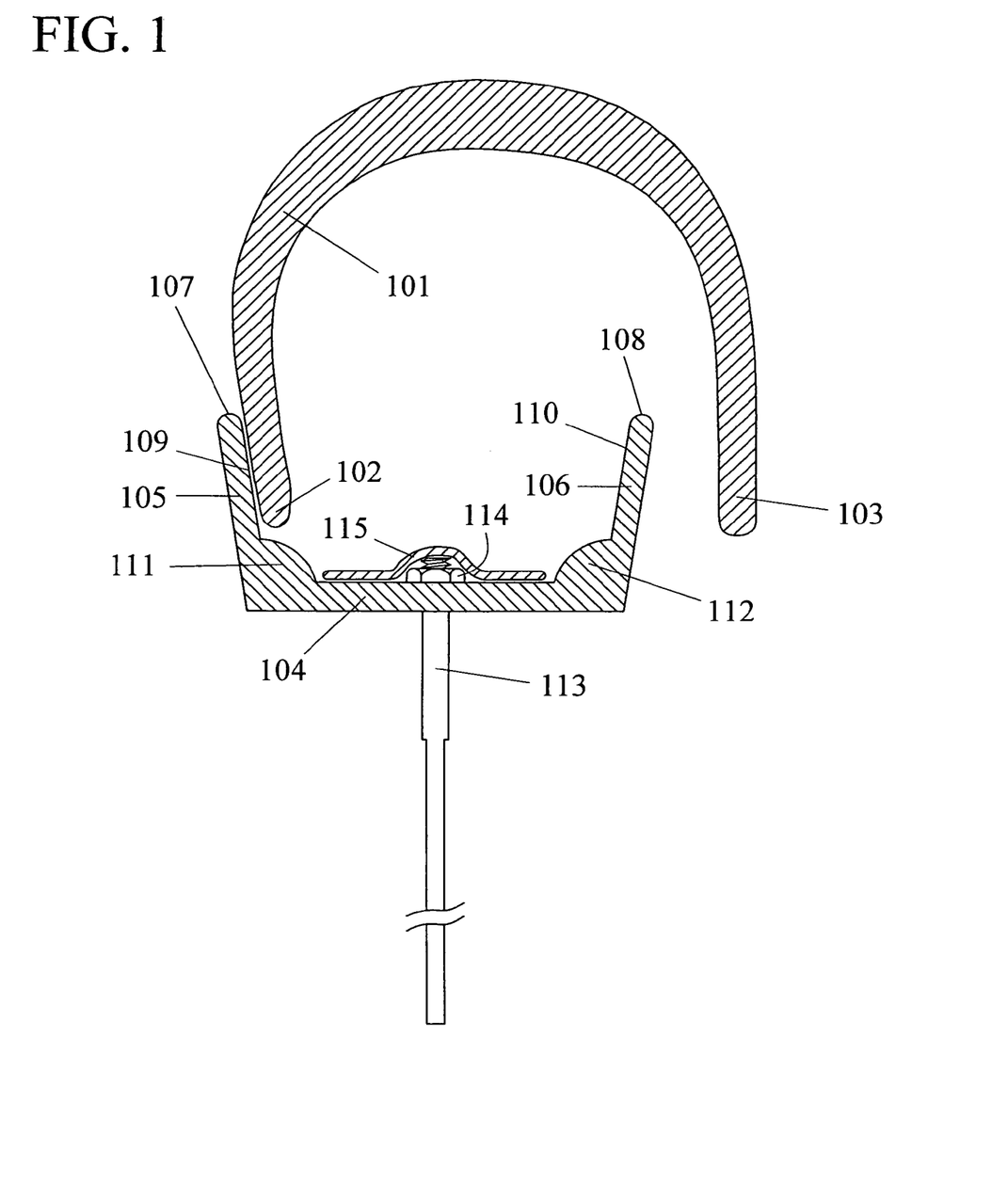
FIG. 1. Bicycle tire, halfway mounted on bicycle rim.
Figure 2:
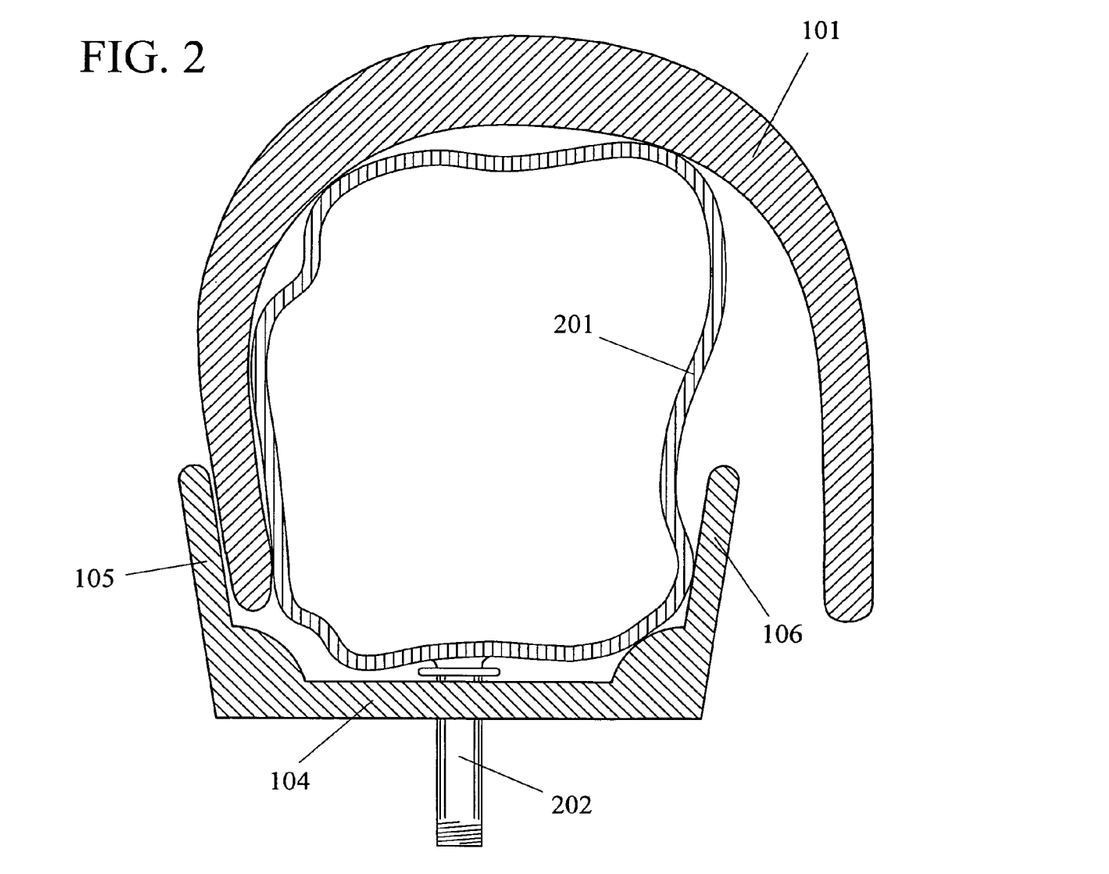
FIG. 2. Bicycle tire and rim of FIG. 1, with inner tube installed.
Figure 4A:
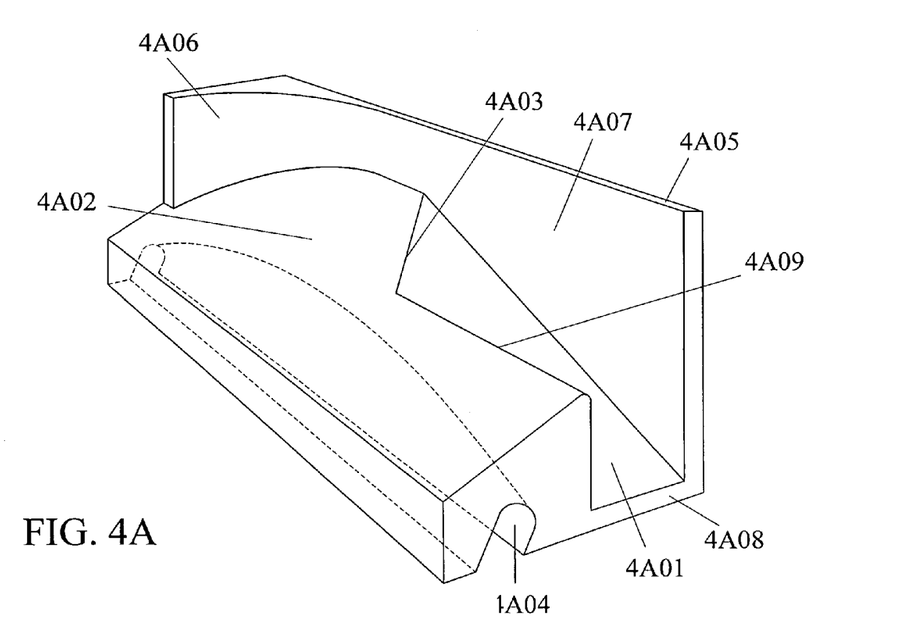
FIG. 4A. Perspective view of simple block embodiment.
Figure 4B:
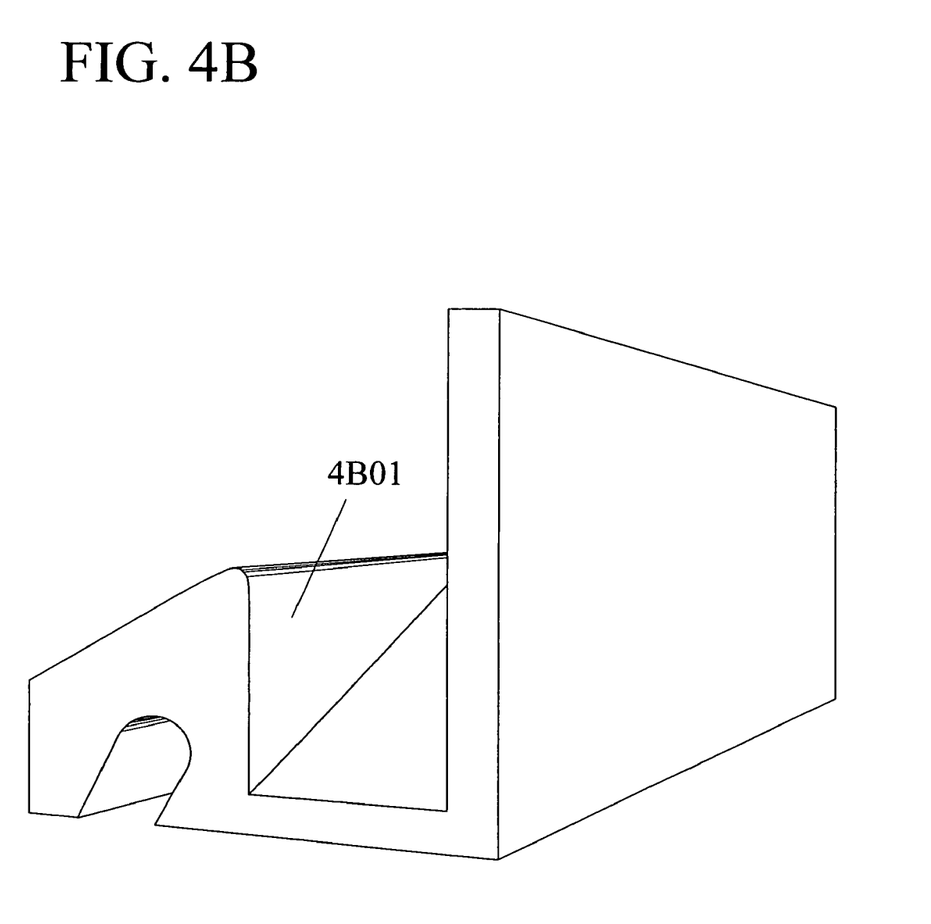
FIG. 4B. Alternate perspective view of simple block embodiment that reveals features hidden from direct view in FIG. 4A.
Figure 4C:
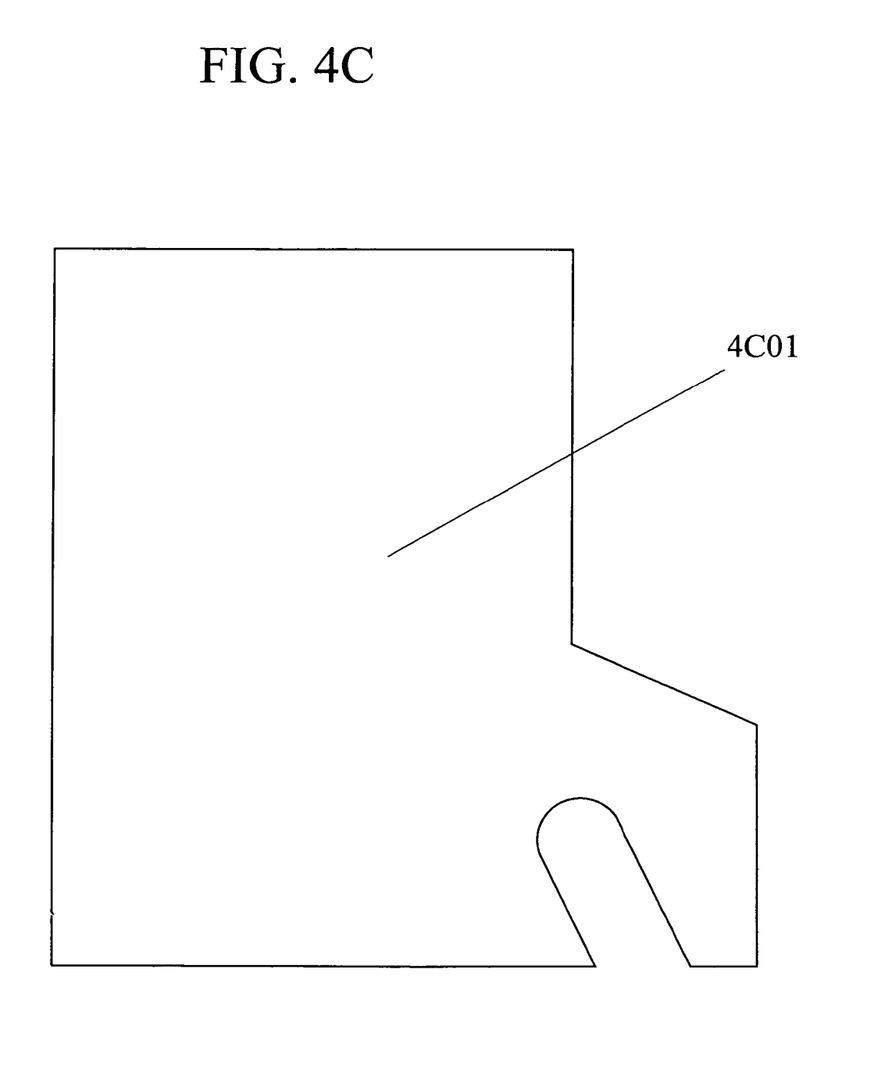
FIG. 4C. Rear surface view that reveals features hidden from direct view in FIG. 4A and FIG. 4B.
Figure 5:
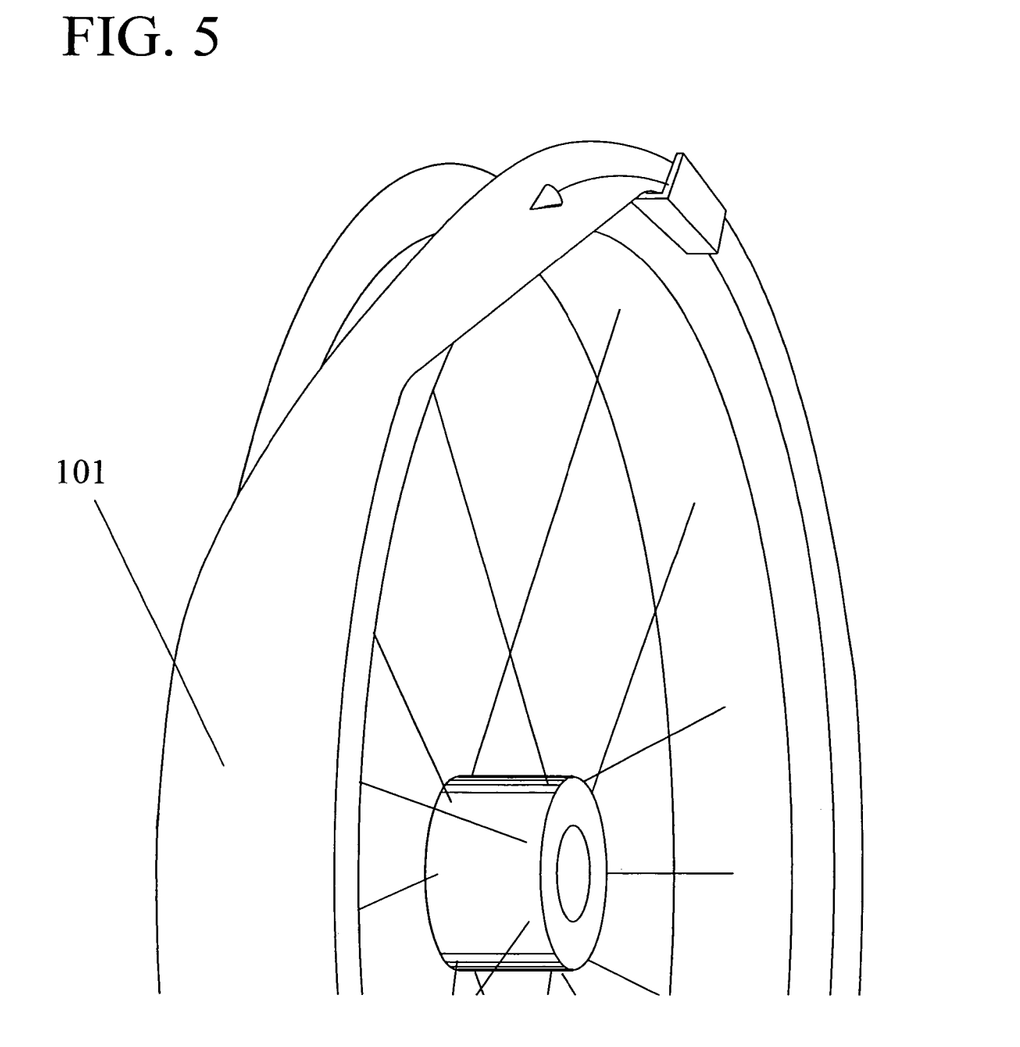
FIG. 5. One embodiment of invention, the simple block, in use.

For FIG. 1:
101 Bicycle tire
102 Bicycle tire bead, first of two
103 Bicycle tire bead, second of two
104 Bicycle wheel rim base
105 Bicycle wheel rim flange, first of two
106 Bicycle wheel rim flange, second of two
107 Bicycle wheel rim flange's edge, first of two
108 Bicycle wheel rim flange's edge, second of two
109 Bicycle wheel rim flange's inner face, first of two
110 Bicycle wheel rim flange's inner face, second of two
111 Rim fillet, first of two
112 Rim fillet, second of two
113 Bicycle tire spoke
114 Bicycle tire spoke nut
115 Protective rubber strip
For FIG. 2:
201 Bicycle inner tube
202 Bicycle inner tube's filler valve stem
For FIG. 3:
301 Bicycle wheel hub
302 Section of tire bead under tension
For FIG. 4A:
4A01 Simple Block's upward slope
4A02 Simple Block's downward slope
4A03 Simple Block's slope transition edge
4A04 Simple Block's supporting slot
4A05 Simple Block's bead guide wall
4A06 Simple Block's bead pushing wall
4A07 Simple Block's bead guide wall inside face
4A08 Simple Block's front face
4A09 Simple Block's inner guide wall crest
For FIG. 4B:
4B01 Simple Block's inner guide wall
For FIG. 4C:
4C01 Simple Block's rear face
For FIG. 5: (no new designations)
For FIG. 6A: (no new designations)
For FIG. 6B: (no new designations)
For FIG. 6C: (no new designations)
For FIG. 6D: (no new designations)
For FIG. 7:
701 Smooth block's supporting slot
702 Smooth block's forward face (1 of 2)
703 Smooth block's forward face (2 of 2)
704 Smooth block's junction line
705 Smooth block's smoothed upward slope
706 Smooth block's interior lower long edge
707 Smooth block's vertical corner edge
708 Smooth block's interior upper edge
709 Smooth block's downward slope
710 Smooth block's bead pushing face
711 Smooth block's slope transition edge
712 Smooth block's upper trailing edge
713 Smooth block's lower trailing edge
714 Smooth block's bead guide wall inside face 715 Smooth block's bead guide wall
716 Smooth block's crest edge
717 Smooth block's bead pushing guide face edge
718 Smooth block's downward slope leading top edge
719 Smooth block's slot lower edge
720 Smooth block's elevating ramp inside leading edge
721 Smooth block's elevating ramp outside leading edge
722 Smooth block's slot entrance
For FIG. 8:
801 Deep depression
802 Internal threads

DETAILED DESCRIPTION

Introduction

The preceding sections of this application, particularly the text that referenced FIGS. 1 through 3, introduced the parts of a bicycle wheel that one deals with when mounting its tire. This section will first provide the specific component designations with their numerical references for FIGS. 1, 2 and 3, and then move on to identify with the same specificity all the physical features of two embodiments of the invention. The need to make specific the features of the bicycle rim and tire is only that they are referred to in the operations sections of this the detailed description portion of the application.

In the descriptive portion upcoming, five objects of homogeneous composition are detailed. These are the bicycle tire, the bicycle inner tube, the bicycle rim, and two possible embodiments of the invention. Since a homogeneous object can't be disassembled into constituent pieces that each do one or several particular functions, the reference numbers and leadlines of the figures that present these objects will refer to areas of the object's surfaces or to portions of the object's total material. The extent of each physical feature identified by reference number and leadline will be obvious by the description matched to that reference number.

Also, all feature reference numbers of this application begin with the designation of the figure they are in, for example 2 or 4B, and are followed by the two digit number corresponding to that particular feature within that figure, say 17. The two digit numbers that correspond to particular features begin with 01, proceed upward in increments of 1 towards a maximum possible of 99.

Details to FIGS. 1, 2, and 3

Referring to FIG. 1, we have a cross sectional view of a bicycle wheel rim made up of base 104, and rim flanges 105 and 106. Also in FIG. 1 is bicycle tire 101 shown with one of its beads 102 placed on the rim, the other bead 103 is shown still off the rim. Bead 102 is shown mated against the bicycle wheel rim flange's inner face 109. When fully installed, bead 103 will lie against bicycle wheel rim flange's inner face 110 in a symmetrical manner to that of the bead 103 and flange inner face 109 pair. Seen as tips or rounded points of flanges 105 and 106 in the cross sectional view shown, bicycle wheel rim flange's ridges, or edges, 107 and 108 are the structural features the tire beads 102 and 103 must be pulled over to have the tire mounted on the rim. Bicycle wheel spoke 113, bicycle wheel spoke nut 114, and the protective rubber strip 115 were included in this figure simply to provide some orientation structure to the bicycle wheel rim relative to the bicycle wheel. Structural fillets 111 and 112 are included only because they were construction features of an actual rim that was used to obtain the typical rim cross section used here in FIGS. 1 and 2.

Referring now to the cross sectional view shown in FIG. 2, we see the same bicycle tire and wheel rim that were presented in FIG. 1, except the bicycle tire inner tube 201 and its filler valve stem 202 have been mounted on the rim within the confines of the tire 101, the rim base 104, and rim flanges 105 and 106.

Referring to FIG. 3, a bicycle wheel including its tire near the end of the mounting process is shown, along with the bicycle wheel hub 301, and some components previously introduced and here identified by number. This figure is presented to show the remaining section of the tire to be mounted 302. Tire section 302 is under tension.

Details for Two Embodiments:

One embodiment of the invention is shown in the different views of FIGS. 4A, 4B, and 4C. I will refer to the embodiment of the invention shown in FIGS. 4A, 4B, and 4C and described using the reference numbers in FIGS. 4A, 4B, and 4C hereafter as the "simple block", for it is not an optimized embodiment, but due to its simplicity it is, however, an excellent embodiment to illustrate the features and functioning of the invention. After the physical features of the simple block are identified, and after the operation of the simple block has been covered, an improved embodiment hereafter referred to as the "smooth block" will be presented and detailed in the same manner. Then, enhancements that apply to both embodiments will be presented.

Detailed Description, the Simple Block:

The simple block is shown in perspective view in FIG. 4A. One will note immediately that it could be made from a single homogeneous block of material. Put another way, it need not be comprised of individually fabricated component parts adhered together (although it could be).

The simple block shown in FIG. 4B is in a different perspective view than that of FIG. 4A to enable the identification of surfaces hidden in FIG. 4A. FIG. 4C is a straight on view of the rear of the simple block to enable the identification of its surface hidden from view in both FIG. 4A and FIG. 4B.

Referring now to the simple block shown in FIG. 4A, one sees it is a contoured block of material, easily fashioned from a rectangular solid, featuring an upward slope 4A01, a downward slope 4A02, a supporting slot 4A04, and a bead guide wall 4A05. The upward slope 4A01 meets the downward slope 4A02 at the slope transition edge 4A03. Supporting slot 4A04 begins at the front face 4A08 and extends all the way to the rear surface of the simple block (not visible in FIG. 4A). Slot 4A04 also opens to the simple block's bottom, a small portion of that opening visible in FIG. 4A where slot 4A04 terminates at the front face 4A08. The bead guide wall widens at its rear to establish the bead pushing face 4A06.

Referring now to FIG. 4B, the simple block is again shown in perspective view from above and front, but from the other side. Expressed differently, from the side that now hides the bead guide wall inside face 4A07 from direct view, but allows one to see most of inner guide wall 4B01. Slope 4A01, wall 4A05, and wall 4B01 collectively form a bead elevating ramp.

Referring now to FIG. 4C, the simple block's rear face 4C01 is presented in a straight on view.

Figure 6A:
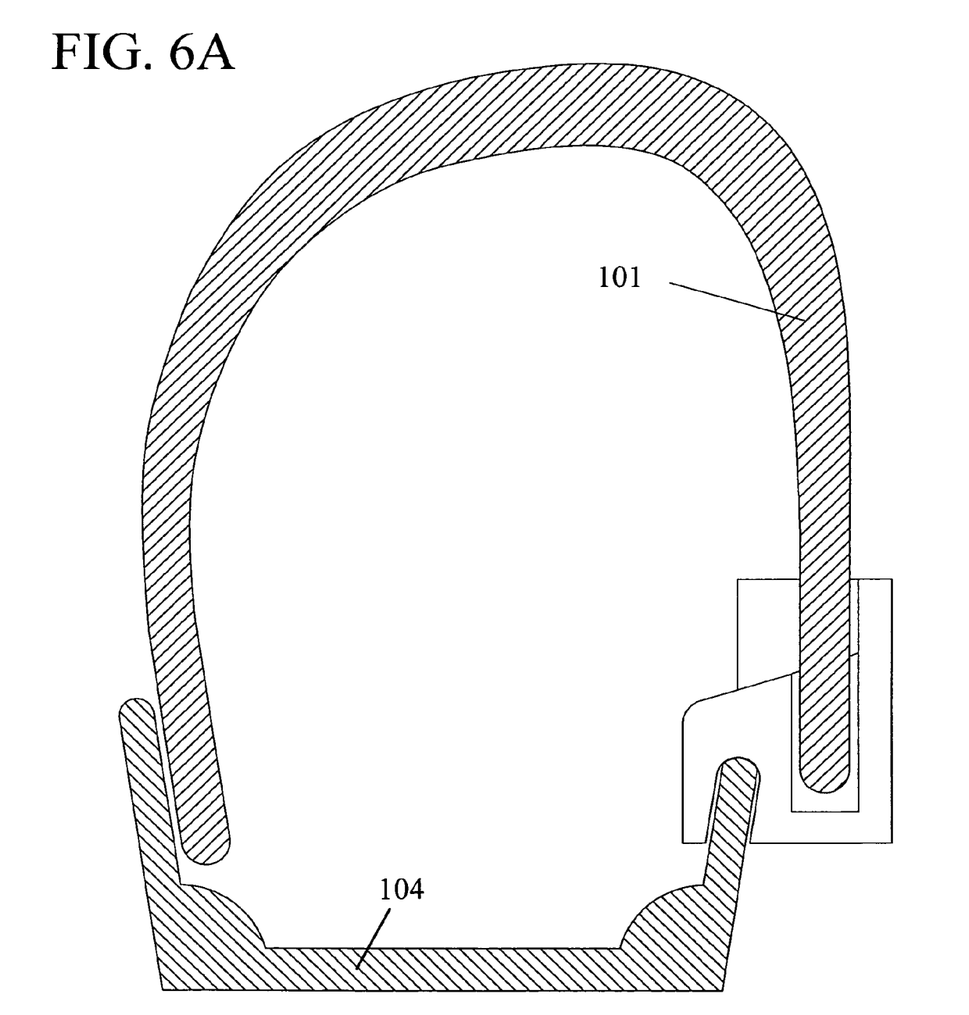
FIG. 6A. Tire bead mounting progress, tire bead segment just entered simple block's elevating ramp.
Figure 6B:
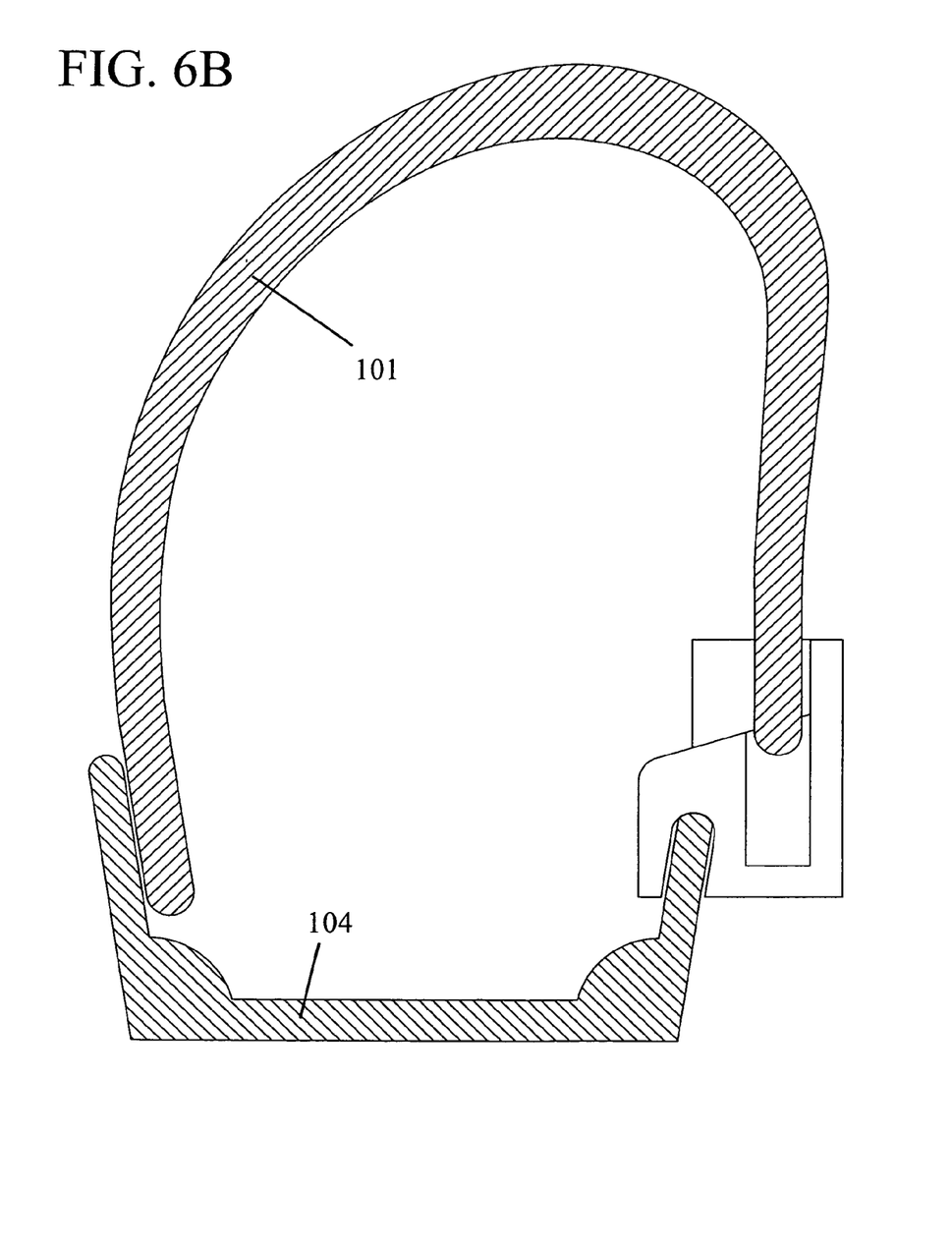
FIG. 6B. Tire bead mounting progress, tire bead segment near top of simple block's elevating ramp.
Figure 6C:
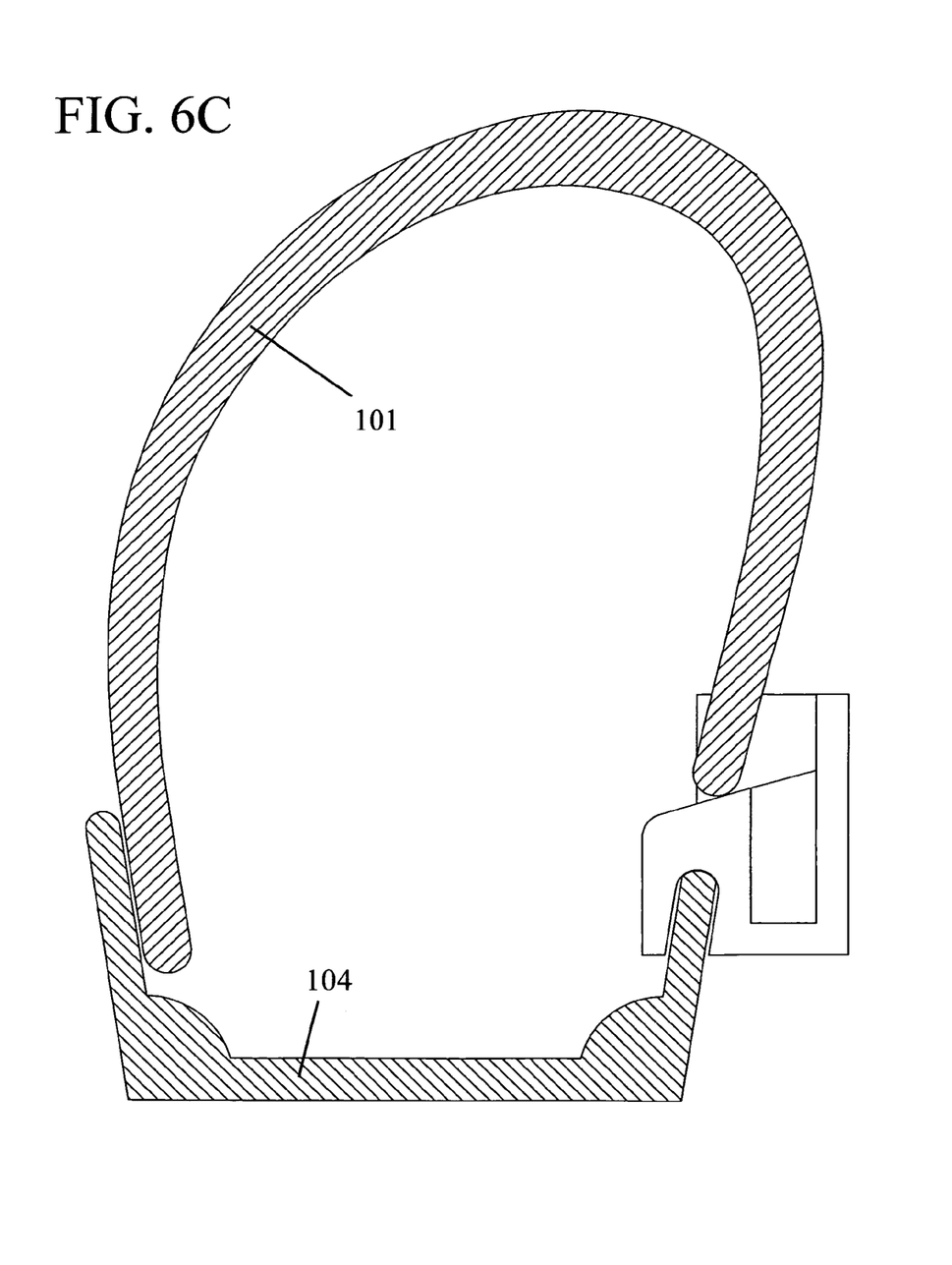
FIG. 6C. Tire bead mounting progress, tire bead segment just past simple block's slope transition edge, sliding down the simple block's downward slope.
Figure 6D:
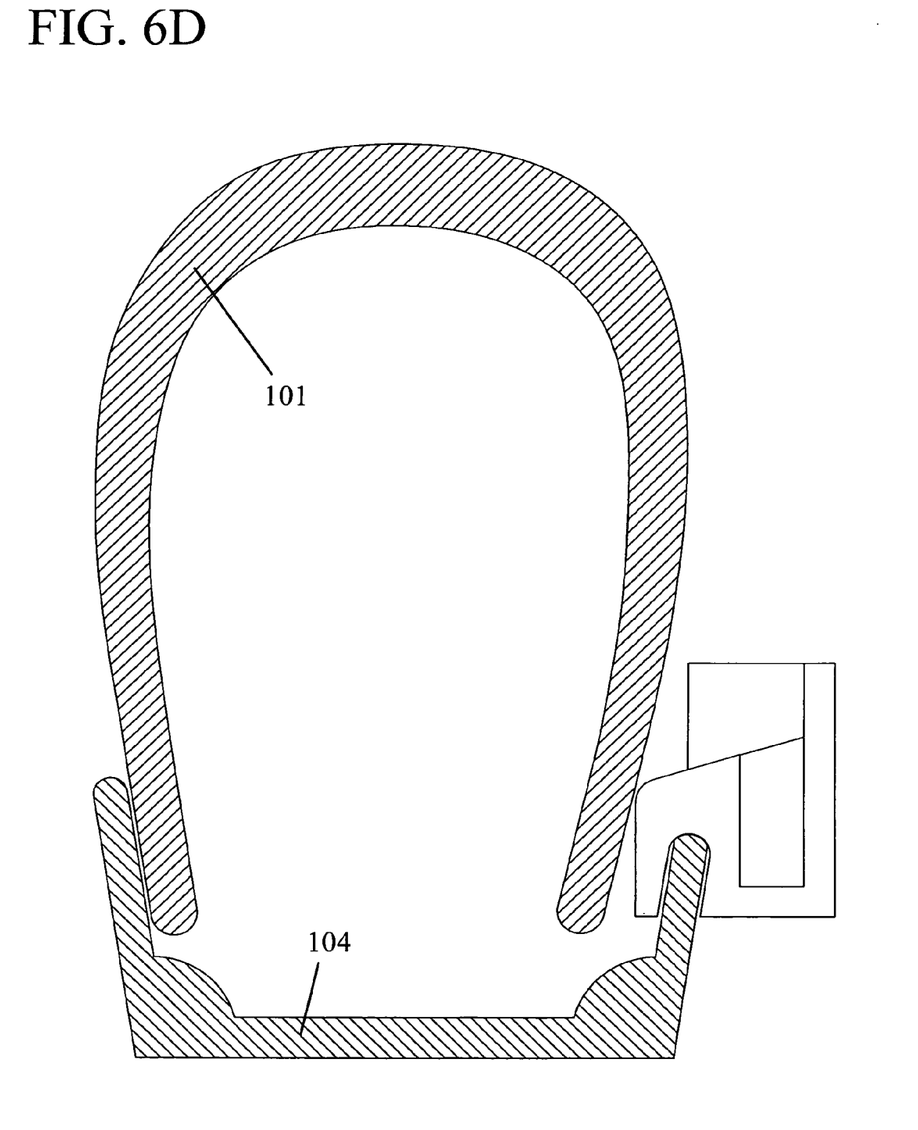
FIG. 6D. Tire bead mounting complete, tire bead placed within wheel rim's flanges.

Operation, the Simple Block:

One advances the tire mounting operation until the second tire bead to be placed on the rim is still easily placeable by hand, but whose tension is beginning to rise noticibly. One then places the simple block onto flange 106 such that slot 4A04 receives flange 106, and the majority of the bead guide wall 4A05 is outboard of flange 106. The simple block is now ready to traverse flange 106, being supported and guided by flange 106, reminiscent of a monorail car riding upon its supporting and guiding rail. One then slides the simple block up to where the tire bead crossing over flange 106 blocks further progress of the simple block. Next, the tire bead 103 at that location is lifted by hand into the simple block's elevating ramp. This point in the progress is depicted in FIG. 5. To place the remaining section of tire bead 302 onto the tire rim, one simply impels the simple block forward along flange 106 with impacts delivered to the simple block's rear face 4C01. The upward slope 4A01 of the elevating ramp lifts successive segments of tire bead 302 up to the height of the slope transition edge 4A03. Past this point, the bead is allowed to slip downward on downward slope 4A02 into the area between flanges 105 and 106. The bead pushing face 4A06 ensures that the bead exits off the simple block's downward slope 4A02 at a point between flanges 105 and 106. As one continues, successive segments of tire bead rides up and then down the simple block's slopes. This process is illustrated in FIGS. 6A,6B,6C, and 6D. FIG. 6A shows a segment of bead just starting its travel up the elevating ramp. FIG. 6B shows that same segment of bead having progressed further up the elevating ramp such that it is near the top, close to slope transition edge 4A03. FIG. 6C shows the same bead segment having crossed the slope transition edge 4A03 and beginning its slide down the downward slope 4A02. The very last segment of tire bead to be placed on the rim will actually use only the very top of the elevating slope before it slides over the simple block's inner guide wall crest 4A09 and into the rim's confines. Crest 4A09 is rounded off so the last segment of bead will not hang up passing over it. Once the tire bead is completely inside flanges 105 and 106, there is no downward pressure on the simple block. This state is shown in FIG. 6D. The only pressure remaining on the simple block is a very slight amount exerted by the now seated tire bead 103 outward, pushing the simple block against the inner face 110 of flange 106. The simple block can now be lifted off flange 106.

Figure 7:
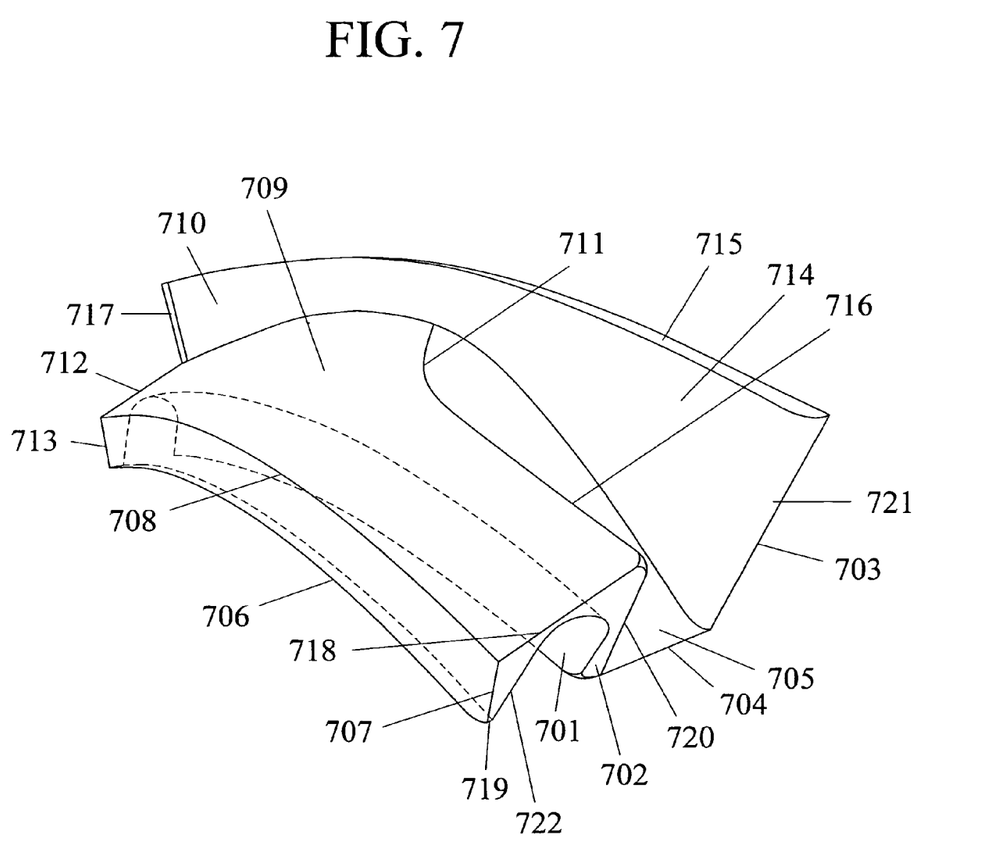
FIG. 7. Perspective view of the smooth block.
Figure 8:
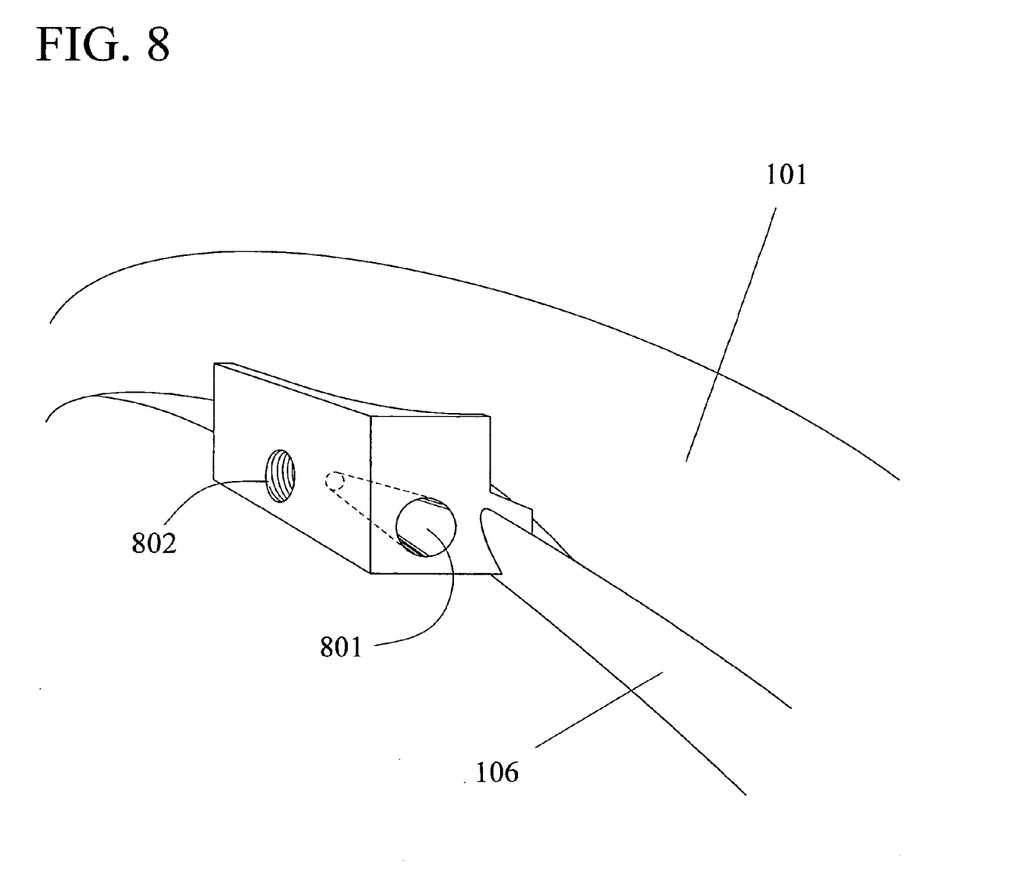
FIG. 8. Perspective rear view of simple block, resting on wheel rim, showing enhancements possible.

Detailed Description, the Smooth Block:

Presented in FIG. 7 is a perspective view of the smooth block. The most obvious difference between this and the simple block is that this embodiment is bent to conform to the radius of the hosting wheel rim. The amount of bend in the smooth block shown in FIG. 7 is exaggerated from what an actual realization of this embodiment would typically have to distinguish it from the simple block. The bend incorporated into this embodiment allows the supporting slot 701 to be made the same depth (or "height", if one wishes to think of the slot in terms of a tunnel) over its entire length to fully engage flange 106 over the entire front to rear length of the smooth block. This results in better lateral support from flange 106 than the simple block could receive.

The smooth block also incorporates rounded corners instead of dihedral surfaces anywhere along the path the tire bead is meant to slide. This is to reduce the drag the path presents to the tire bead, resulting in easier operation, and less wear to the tire bead. Most dramatic is the smoothed upward slope 705. The introduction of slope 705 creates two distinct but still coplanar forward faces 702 and 703 out of what was one forward face. Instead of the plane surface of the simple block's upward slope 4A01 joining the simple block's forward face 4A08 in a dihedral angle, the smooth block's smoothed upward slope 705 curves downward as it approaches the forward surfaces of the smooth block, and is connected to the plane defined by faces 702 and 703 only by the junction line 704 that is the junction of the forward edge of smoothed upward slope 705 and the bottom of the smoothed block. The purpose to having the rounded leading edge of slope 705 begin with a vertical slope before rounding to slopes of increasing horizontal content is to ensure that the tire bead entering slope 705 will only traverse smoothed entry features despite the fact the tire bead will approach slope 705 from varying angles.

Another rounded feature is the smooth block's slot entrance 722, rounded to prevent scraping wear to the bicycle wheel rim flange 106 during use.

Other rounded features are downward slope leading top edge 718, slot lower edge 719, the interior lower long edge 706, the interior upper edge 708, and the vertical corner edge 707. These features are rounded off to prevent damage to the inner tube as the smoothed block slides forward along the flange 106. Elevating ramp inside leading edge 720, elevating ramp outside leading edge 721, slope transition edge 711, upper trailing edge 712, lower trailing edge 713, and bead pushing guide face edge 717 are smoothed for reduced wear to the tire bead. Crest edge 716 is rounded off to enable the last section of tire bead to transition from the upward slope 705 to downward slope 709 without encumbrance. Obviously, the rounding of some of the surfaces just mentioned reduce the wear to both the inner tube and the tire.

Some physical features of the smooth block, though bent in shape to conform with the curvature of the hosting rim, are unchanged in function from their simple block's counterparts. Those features are the smooth block's bead guide wall 715, the smooth block's bead guide wall inside face 714, and the smooth block's bead pushing face 710.

Operation, the Smooth Block:

The smooth block is a variation of the simple block, in that it incorporates improvements to the simple block. Particularly, many of the smooth block's edges are rounded to reduce wear to the tire bead, and the smooth block's slot 701 follow the curvature of the hosting rim for greater lateral support. One can see that the improvements to the supporting slot or smoothing improvements built into the bead traversing surfaces do not alter the way in which one applies the tool to complete the mounting of the tire. Therefore, the operation of the simple block and the smooth block are the same.

Enhancements Applicable to Both the Simple Block and to the Smooth Block:

An enhancement can be added to either embodiment presented above to increase its ease of use by providing a shallow or deep depression in its rear face, the intent being to provide a stable, nonmoving point for application of impact, so as to enable the use of a tool such as a nail set to act as an extension of the rear face of the traveling block. This extension permits the impact delivery tool (such as a hammer) to apply its force to the body of either embodiment presented above on a larger and more accessible target surface.

Another enhancement can be added to either embodiment presented above to increase its stability in use by providing a deep depression in its rear face extending significantly far forward into the body of the invention. This affords greater stability to the invention as it is driven along because the forward impacts are now applied forward of or amidst of much of either embodiment's sources of drag, instead of from behind them all.

It can be seen that the enhancement providing ease of use is accomplished by providing either a shallow or deep depression, but the enhancement to increase operational stability is accomplished only with a deep (far forwardly placed) depression. It can therefore be seen a deep depression can provide both enhancements simultaneously. This deep depression 801 is shown incorporated into the rear of the simple block in FIG. 8.

Yet another enhancement can be added for the safety of the user of either of the embodiments presented above. This enhancement is the addition of a restraint that limits the distance the simple or smooth block can travel off the wheel's rim when the mounting process completes. It is when the process completes that the tension from the tire bead that has kept the simple or smooth block in contact with the rim is suddenly removed. Internal threads 802 are shown incorporated into the side of the simple block in FIG. 8. These threads could receive an eyebolt to which a tethering be secured to serve as one means of restraint.

CONCLUSION

The description above presented two embodiments of many possible of a simple, compact, lightweight hand tool that enables the completion of a bicycle tire installation to be done in a shop environment or in the field (such as by the side of the road) in a manner easier than those provided by currently existing tools.

It should be noted that the use of this tool, since it performs its function by being driven along by impacts to its rear surface, will cause the hosting wheel rim to rotate if not restrained. If the bicycle whose wheel rim the tire is being mounted to is being used as a service jig (as would be the case in a roadside repair), stuffing of a rag or other similar jamming material between the frame of the bicycle and the wheel will be required to prevent rotation of the bicycle's wheel as the tool is impelled along.

It should also be noted that both the embodiments of the invention presented above, and many similar embodiments could be made from a wide variety of materials. One good candidate is brass. Another is soft steel. It is obvious that as one makes the constituent material harder, the tool will last longer, but the more wear will be put on the wheel rim. Conversely, if the material used is softer, the rim will experience less wear, but the tool will wear faster. Reduction of wear to both the wheel rim and the tool can be accomplished by the application of a lubricant, such as grease, to the wheel rim's edge.

It should be further noted that since the rim geometries vary considerably (diameter, height of wheel rim flange edges off the wheel rim base, angle of the flanges to the plane the wheel rim base defines, etc.) that one particular physical realization of the invention having set dimensions cannot accommodate all existing rims. Therefore, any real constructed embodiment of this invention will need to be marked with information linking it to a particular rim geometry. The marking could be printed on, stamped on, embossed in, engraved on, molded in, etc., depending on how the particular tool is fabricated.

I claim:

1. A tool for completing the mounting of a bicycle tire upon a bicycle rim, comprising:

a mass of rigid material having an overall shape sufficiently close to that of an arcuately bent beam of substantially rectangular and substantially uniform cross section to have identifiable a convexly arched upper surface, a concavely arched lower surface, an essentially flat forward surface, an essentially flat rearward surface, an essentially flat first side surface and an essentially flat second side surface, said upper surface being constructable from the outer cylinder of a pair of concentric cylinders, said lower surface being constructable from the inner cylinder of said pair of concentric cylinders, said pair of concentric cylinders being separated by a distance r along a radial line originating on the axis of said pair of concentric cylinders, both ends of each cylinder of said pair of concentric cylinders being perfectly circular, versus elliptical, in shape, each cylinder of said pair of concentric cylinders possessing a height h, as measured along their common axis, said inner cylinder being capped on one of its ends by a first plane that possesses a normal that is parallel to the axis of said pair of concentric cylinders, said outer cylinder also being capped on one of its ends by said first plane, said inner cylinder being capped on its end not coincident with said first plane by a second plane that is parallel to said first plane and spaced a distance d from said first plane along the axis of said pair of concentric cylinders, said outer cylinder also being capped on its end not coincident with said first plane by said second plane, said height h and said distance d being equal, said lower surface and said upper surface being those areas of said inner cylinder and said outer cylinder, respectively, that lie within an acute dihedral angle between a pair of intersecting planes that intersect and terminate on the axis of said pair of concentric cylinders, said intersecting planes being a forward intersecting plane and a rearward intersecting plane, said first side surface being coplanar with said first plane, the borders of said first side surface being the curved edges of said lower surface and said upper surface that lie in said first plane and the two radial lines that originate from the axis of said pair of concentric cylinders, also lie within said first plane, and connect a corner of said lower surface to a corner of said upper surface, said second side surface being coplanar with said second plane, the borders of said second side surface being the curved edges of said lower surface and said upper surface that lie in said second plane and the two radial lines that originate from the axis of said pair of concentric cylinders, also lie within said second plane, and connect a corner of said lower surface to a corner of said upper surface, said mass of rigid material thus having a cross section with two opposing sides of length d, and its other opposing sides of length r, and if d equals r in length, said cross section is the special case of a square, said forward surface lying in said forward intersecting plane, the borders of said forward surface being the straight edges of said lower surface and said upper surface that lie in said forward intersecting plane and the two radial lines that originate from the axis of said pair of concentric cylinders, also lie within said forward intersecting plane, and connect a corner of said lower surface to a corner of said upper surface, said rearward surface lying in said rearward intersecting plane, the borders of said rearward surface being the straight edges of said lower surface and said upper surface that lie in said rearward intersecting plane and the two radial lines that originate from the axis of said pair of concentric cylinders, also lie within said rearward intersecting plane, and connect a corner of said lower surface to a corner of said upper surface, said lower surface incorporating a longitudinal slot of substantially uniform cross section extending from said forward surface to said rearward surface, said longitudinal slot formed by the removal of material from said lower surface such that said lower surface remains substantially smooth, and except for its overall arched shape and the opening of said longitudinal slot, also remains substantially featureless, said longitudinal slot optimally extending all the way from said forward surface to said rearward surface without irregularities such as gaps, said longitudinal slot having two opposing inner walls and a bridging surface that bridges said inner walls at the innermost recess of said longitudinal slot, said bridging surface usually having a semicircular cross section, although other cross sectional shapes could be employed instead, said longitudinal slot having an axial position closer to said first side surface than to said second side surface, said upper surface incorporating two inclined surfaces, a first inclined surface and a second inclined surface, both inclined surfaces formed by the removal of material from said upper surface, said first inclined surface joining said second inclined surface at a transition location substantially midway between said forward surface and said rearward surface, said first inclined surface beginning at said forward surface, progressing rearward, and ending at said transition location, said first inclined surface having two opposing interior walls and a spanning surface forming a floor between said interior walls, said interior walls and said spanning surface collectively forming a trough with its opening facing radially upward, and its entrance cut into said forward surface, said spanning surface of said first inclined surface making the transition into said second inclined surface essentially seamlessly at said transition location, said spanning surface possessing increasing radial height as it progresses from said forward surface towards said rearward surface, the initial radial height of said spanning surface at said forward surface being less than that of said bridging surface of said longitudinal slot, and the final radial height of said spanning surface being both greater than that of said bridging surface of said longitudinal slot and less than that of said upper surface, said first inclined surface having an axial position between said longitudinal slot and said second side surface, the walls of said first inclined surface being formed so as to have the wall closest to said second side surface continue past said transition location to said rearward surface, and to have the wall closest to said first side surface diminish in height relative to the radial height of said spanning surface to nothing at said transition location, said second inclined surface formed so as to be substantially a continuation of said spanning surface of said first inclined surface, except that the slope of said second inclined surface is such that the radial height of any point on said second inclined surface decreases as the axial position of that point is moved closer to said first side surface, said second inclined surface formed so as to pass over said longitudinal slot as it descends from the radial height associated with said transition location to a radial height significantly less than that associated with said transition location, said second inclined surface formed to have a smooth surface, said mass of rigid material and all the features formed into it as specified in the preceding formed so as to possess no sharp edges, said mass of rigid material and its incorporated features having been specified with geometrical terms in the preceding being conceptual constructions made to unambiguously present the essential features and aspects of the invention with the understanding that any actual physical fabrications of the invention can approach, but never achieve, the dimensional perfection a mathematical definition offers.

2. The tool of claim 1, wherein the wall of said first inclined surface closest to said second side surface both extends from said forward surface to said rearward surface and whilst in proximity to or rearward of said transition location curves toward said first side surface to terminate substantially nearer to said first side surface than to said second side surface.

3. The tool of claim 2, further including a depression formed into said rearward surface so as to be substantially conical in shape, oriented with its apex inward and its substantially circular directrix located on and coplanar with said rearward surface, said conical depression created by the removal of material from said rearward surface.

4. The tool of claim 3, further including a threaded hole incorporated into any of its otherwise unutilized surfaces.

\* \* \* \* \*